United States Patent [19]

Kast

[11] 4,176,229
[45] Nov. 27, 1979

[54] BASIC DYES

[75] Inventor: Hellmut Kast, Bobenheim-Roxheim, Fed. Rep. of Germany

[73] Assignee: BASF Aktiengesellschaft, Ludwigshafen, Fed. Rep. of Germany

[21] Appl. No.: 930,200

[22] Filed: Aug. 2, 1978

[51] Int. Cl.² .......................................... C07D 209/04
[52] U.S. Cl. ................................... 542/422; 542/423
[58] Field of Search ............................... 542/422, 423

[56] References Cited

U.S. PATENT DOCUMENTS

| | | | |
|---|---|---|---|
| 3,113,825 | 10/1963 | Streck | 542/422 |
| 3,759,902 | 9/1973 | Kuhlthau et al. | 542/422 |
| 3,786,047 | 1/1974 | Kuhlthau | 542/422 |
| 3,904,613 | 9/1975 | Schmitt | 542/422 |

FOREIGN PATENT DOCUMENTS 2452321  5/1976  Fed. Rep. of Germany ............ 542/422

*Primary Examiner*—Arthur P. Demers
*Attorney, Agent, or Firm*—Oblon, Fisher, Spivak, McClelland & Maier

[57] ABSTRACT

Dyes of the general formula I

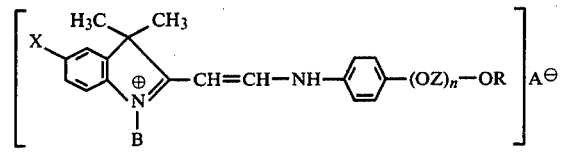

where $A^{\ominus}$ is an anion, B is methyl, ethyl, benzyl or β-hydroxyethyl, n is 1 or 2, R is alkyl of 1 to 4 carbon atoms, X is hydrogen, methoxy, ethoxy or chlorine and Z is

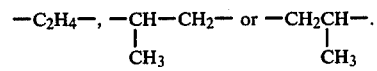

The dyes of the formula I give very fast dyeings on anionically modified fibers.

2 Claims, No Drawings

BASIC DYES

The present invention relates to a dye of the general formula I

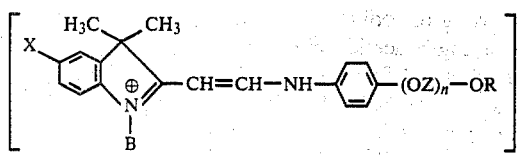

where $A^\ominus$ is an anion, B is methyl, ethyl, benzyl or β-hydroxyethyl, n is 1 or 2, R is alkyl of 1 to 4 carbon atoms, X is hydrogen, methoxy, ethoxy or chlorine and Z is

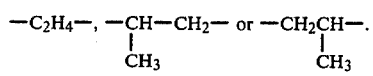

The compound of the formula I may be prepared by condensing a compound of the formula

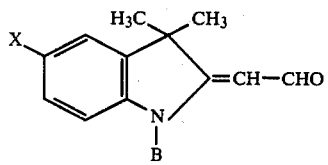

with a compound of the formula

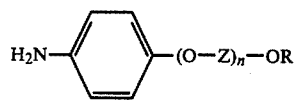

in the conventional manner.

Details of the method of preparation may be found in the Examples, where parts and percentages are by weight, unless stated otherwise.

The dyes of the formula I are particularly suitable for dyeing anionically modified fibers, e.g. anionically modified nylons, polyesters and acrylonitrile polymers. The dyeings obtained have very good lightfastness, wetfastness and fastness to decatizing.

Particularly important compounds are those of the formula

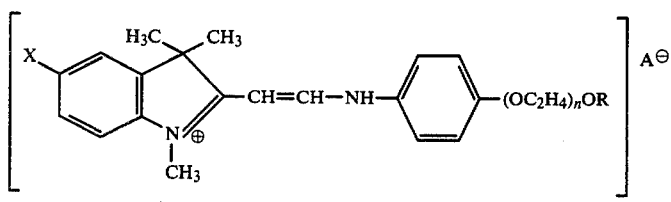

where n, R and X have the stated meanings.

Examples of anions $A^\ominus$ are chloride, bromide, nitrate, phosphate, sulfate, methosulfate, tetrachlorozincate, formate, acetate, benzenesulfonate, toluenesulfonate and dodecylbenzenesulfonate.

Intermediates (A) 30 part of KOH are added in portions to a mixture of 50.9 parts of p-nitrochlorobenzene, 180 parts of N-methylpyrrolidone, 24 parts of pyridine and 30.4 parts of methylglycol at 60° C. After stirring for a further 5 hours at 60° C., the reaction solution is introduced into 2,500 parts of water and the precipitate is filtered off and washed neutral with water. After drying at 50° C., 173 parts of the compound of the formula

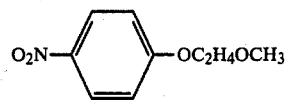

are obtained; melting point 91°–93° C.

The following 4-nitrophenyl alkyl ethers are obtained by a similar method:

| R | Melting point |
|---|---|
| $C_2H_4OC_2H_5$ | 75°–76° C. |
| $C_2H_4OC_3H_7$ | 34°–36° C. |
| $C_2H_4OC_2H_4OCH_3$ | 79°–81° C. |
| $C_2H_4OC_2H_4OC_2H_5$ | 72°–73° C. |

(B) A mixture of 197 parts of 4-nitrophenyl 2'-methoxyethyl ether, 20 parts of Raney nickel and 500 parts of methylglycol is hydrogenated, with hydrogen under 75 bars pressure, at 60° C. The yield of amine is almost quantitative. The solution of 4-aminophenyl 2'-methoxyethyl ether in methylglycol is used as such for the preparation of the dyes. The concentration of amine can be determined by titrating with nitrous acid.

The other nitro compounds described above can be reduced to the amines by a similar method.

EXAMPLE 1

9.2 parts of formic acid are added to a solution of 80 parts of methanol, 20.1 parts of 1,3,3-trimethyl-2-formylmethyleneindoline and 16.7 parts of 4-aminophenyl 2'-methoxyethyl ether (in the form of a solution in methylglycol, see Example 2) at room temperature, and the mixture is then stirred for one hour at 40° C. When the solution has cooled to 20° C., the dye is precipitated by adding 11.5 parts of 85% strength phosphoric acid and is filtered off and washed with 40 parts of cold methanol.

After drying at 60° C., 40.5 parts of the dye of the formula

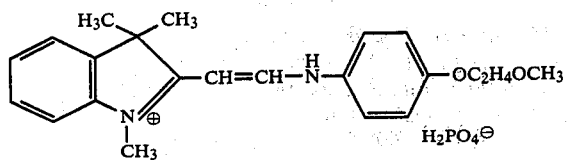

are obtained.

The following cationic dyes are prepared by a similar method

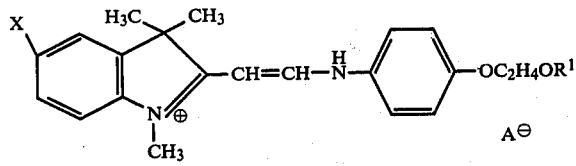

| Example | R' | X | Hue on polyacrylonitrile fibers |
|---|---|---|---|
| 2 | C$_2$H$_5$ | H | greenish yellow |
| 3 | CH$_3$ | Cl | " |
| 4 | C$_2$H$_5$ | Cl | " |
| 5 | C$_2$H$_4$OCH$_3$ | H | " |
| 6 | C$_2$H$_4$OC$_2$H$_5$ | H | " |
| 7 | C$_2$H$_4$OCH$_3$ | Cl | " |
| 8 | C$_3$H$_7$ | H | " |
| 9 | CH$_3$ | OCH$_3$ | " |
| 10 | C$_2$H$_5$ | OCH$_3$ | " |

EXAMPLE 11

25 g of acid-modified polyacrylonitrile fibers are added to a solution of 0.75 g of 30% strength acetic acid, 0.30 g of sodium acetate and 0.125 g of the dye of Example 1, in 1 liter of water at 70° C. The bath is heated to 100° C. in the course of 30 minutes and is kept at this temperature for from 30 to 60 minutes. After rinsing and drying, the polyacrylonitrile fibers exhibit a very fast greenish yellow hue.

EXAMPLE 12

25 of acid-modified polyester fibers are added to a solution of 1 liter of water, 0.125 g of the dye of Example 1 and 30 g of sodium sulfate decahydrate at 60° C. After bringing the pH of the liquor to 4.0 with 30% strength acetic acid, the bath is heated to 115° C. in the course of 45 minutes and kept at this temperature for from 30 to 60 minutes. The goods are then washed with water and dried. The polyester fibers exhibit a very fast greenish yellow hue.

EXAMPLE 13

25 g of acid-modified nylon fibers are added to a solution of 1 liter of water, 0.125 g of the dye of Example 1, 0.5 g of sodium dihydrogen phosphate, 2.0 g of 30% strength acetic acid and 0.25 g of a polyglycol ether, obtained from sperm oil alcohol +28 moles of ethylene oxide, at 50° C. The bath is heated to 100° C. in the course of 30 minutes and kept at this temperature for 60 minutes. The rinsed and dried goods exhibit a very fast greenish yellow hue.

I claim:
1. A basic dye of the general formula

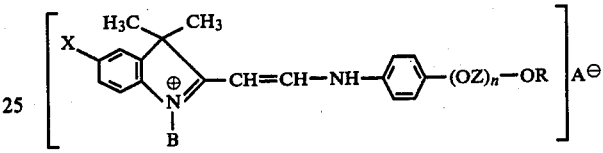

where A$^\ominus$ is an anion, B is methyl, ethyl, benzyl or β-hydroxyethyl, n is 1 or 2, R is alkyl of 1 to 4 carbon atoms, X is hydrogen, methoxy, ethoxy or chlorine and Z is

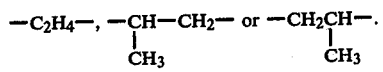

2. A dye as claimed in claim 1, of the formula

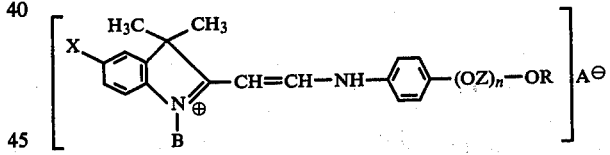

where A$^\ominus$, n, R and X have the stated meanings.

* * * * *

UNITED STATES PATENT AND TRADEMARK OFFICE
CERTIFICATE OF CORRECTION

PATENT NO. : 4,176,229
DATED : November 27, 1979
INVENTOR(S) : HELLMUT KAST

It is certified that error appears in the above-identified patent and that said Letters Patent are hereby corrected as shown below:

Front page, left hand column, in between sections [22] and [51], insert -- [30] FOREIGN APPLICATION PRIORITY DATA Aug. 5, 1977    Federal Republic of Germany    27 35 263 --

Signed and Sealed this

Third Day of June 1980

[SEAL]

Attest:

SIDNEY A. DIAMOND

Attesting Officer    Commissioner of Patents and Trademarks